US008494659B2

(12) United States Patent
McIntosh et al.

(10) Patent No.: US 8,494,659 B2
(45) Date of Patent: Jul. 23, 2013

(54) TIP METER

(75) Inventors: Amy McIntosh, Ankeny, IA (US); Evan Potratz, Des Moines, IA (US)

(73) Assignee: Amy McIntosh, Ankeny, IA (US)

(*) Notice: Subject to any disclaimer, the term of this patent is extended or adjusted under 35 U.S.C. 154(b) by 860 days.

(21) Appl. No.: 12/147,114

(22) Filed: Jun. 26, 2008

(65) Prior Publication Data

US 2009/0322555 A1 Dec. 31, 2009

(51) Int. Cl.
*G06F 15/02* (2006.01)
*G06Q 30/00* (2012.01)

(52) U.S. Cl.
USPC .......................................... 700/15; 700/14.19

(58) Field of Classification Search
USPC ............................ 340/870.09; 700/14.19, 15
See application file for complete search history.

(56) References Cited

U.S. PATENT DOCUMENTS 5,887,903 A 3/1999 Schreadley, Jr.
5,964,823 A * 10/1999 Terriss et al. ................. 708/160
D420,382 S * 2/2000 Dressel ............................ D18/2
6,019,393 A 2/2000 Loebner
6,050,214 A 4/2000 OKeefe
6,076,079 A 6/2000 Boston et al.
6,591,281 B1 * 7/2003 Kawasaki ..................... 708/110
6,636,835 B2 10/2003 Ragsdale-Elliott et al.
6,960,988 B2 11/2005 Blink et al.
7,128,433 B2 * 10/2006 Schlosser ........................ 362/98
7,415,492 B2 * 8/2008 Soliman ........................ 708/130
7,454,370 B2 * 11/2008 Baril et al. ................... 705/14.4
7,457,767 B1 * 11/2008 Dunsmore et al. .............. 705/17
D600,274 S * 9/2009 Schoning ......................... D18/7
7,652,558 B2 * 1/2010 Lovegreen et al. ...... 340/286.09
2001/0037244 A1 11/2001 Mattsom
2002/0194072 A1 * 12/2002 Blink et al. ..................... 705/15
2003/0005004 A1 1/2003 Soliman
2003/0014338 A1 * 1/2003 Chen .............................. 705/35
2003/0078793 A1 4/2003 Toth
2004/0054592 A1 * 3/2004 Hernblad ........................ 705/15
2004/0056473 A1 * 3/2004 Hardison .......................... 281/9
2004/0059689 A1 3/2004 Masden
2004/0158494 A1 * 8/2004 Suthar ............................. 705/15
2006/0085267 A1 4/2006 Lovegreen et al.

* cited by examiner

*Primary Examiner* — Adi Amrany
(74) *Attorney, Agent, or Firm* — Davis Brown Law Firm; Emily Harris

(57) ABSTRACT

A tip meter for providing real time customer satisfaction information to a server is provided. The tip meter displays a tip percentage identified by the customer. During the course of the service experience, the tip percentage is adjusted up or down depending on the customer's real time satisfaction. If the customer decreases the tip percentage, the service staff can attempt to improve service during the rest of the encounter and thereby increase the tip. The tip meter also calculates the total bill, including a particular tip amount for the customer and includes a light to notify staff when service is needed.

17 Claims, 6 Drawing Sheets

TIP METER

BACKGROUND OF THE INVENTION

1. Field

The present invention relates to a tip meter. In particular, the invention relates to a tip meter with a display that customers use to show the real time tip percentage to the service staff during the course of service. The tip percentage may be adjusted up or down depending on the customer's current satisfaction with the service. The tip meter also calculates the total bill, with inclusion of a particular tip percentage, and a light to notify staff when service is needed.

2. Background

Often the wait staff at a restaurant is unaware of a customer's satisfaction with their service until the bill has been paid and the tip is different than expected or the standard. Most commonly, the tip is lower than a "standard" percentage or the tip is non-existent because the customer perceives the service as poorer than expected. The after-the-fact nature of a tip makes it difficult for a server to improve service during the course of a meal.

While customers may complain about service, the complaint may not be voiced until after the meal has been completed, giving the server no opportunity to improve the service and thus improve the tip that the customer elects to pay to the server. Thus, the need exists for a device that conveys a customer's real time, current satisfaction with the service to the server, giving the server the opportunity to improve his or her service.

SUMMARY OF THE INVENTION

One object of the present invention is to indicate a customer's level of satisfaction with the service by providing a real time meter displaying a particular tip percentage.

Another object of the present invention is to provide a calculator that calculates the amount of a tip and the final bill based on the specific percentage identified by the customer.

A further object of the present invention is to provide a light to request wait staff service.

These and other objects of the present invention will become apparent to those skilled in the art upon reference to the following specification, drawings, and claims.

The present invention intends to overcome the difficulties encountered heretofore. To that end, a tip is provided that displays a tip percentage to service staff during the course of a service experience. The tip percentage displayed is real time; the customer adjusts the displayed percentage up or down depending on the satisfaction with the service staff's performance.

DETAILED DESCRIPTION OF THE INVENTION

Figure 1:
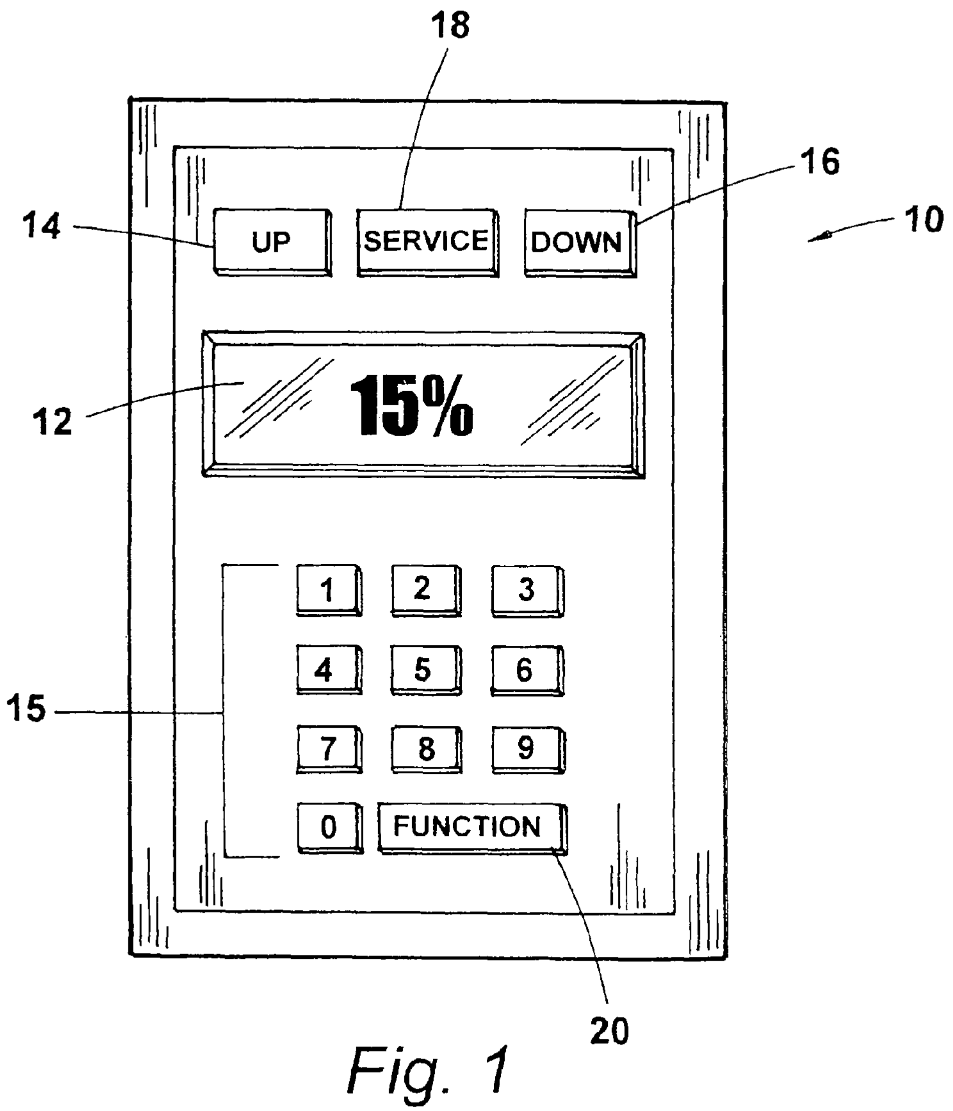
FIG. 1 shows the tip meter of the present invention.

The tip meter 10 is shown generally in FIG. 1. The tip meter 10 includes a display window 12, generally an LCD display.

The tip meter is turned on using the FUNCTION button 20. When the tip meter is turned on, a standard tip percentage is displayed in the display window 12. In one embodiment, the tip percentage displayed is automatically fifteen percent, which is often considered a standard tip. During the course of a service experience the display window 12 shows the real time tip percentage. The tip percentage is adjusted up using up button 14, or down using down button 16, and the tip percentage is shown in the display window 12 as adjusted. The tip meter 10 is displayed so that the service staff can see the meter 10, including the display window 12.

The tip meter includes input buttons 15, used to enter the final bill. When the bill is inputted, the tip meter 10 calculates and displays the complete bill, tip and bill together, in the display window 12. The tip meter 10 also includes a light 18 to notify staff when service is needed.

Figure 6:
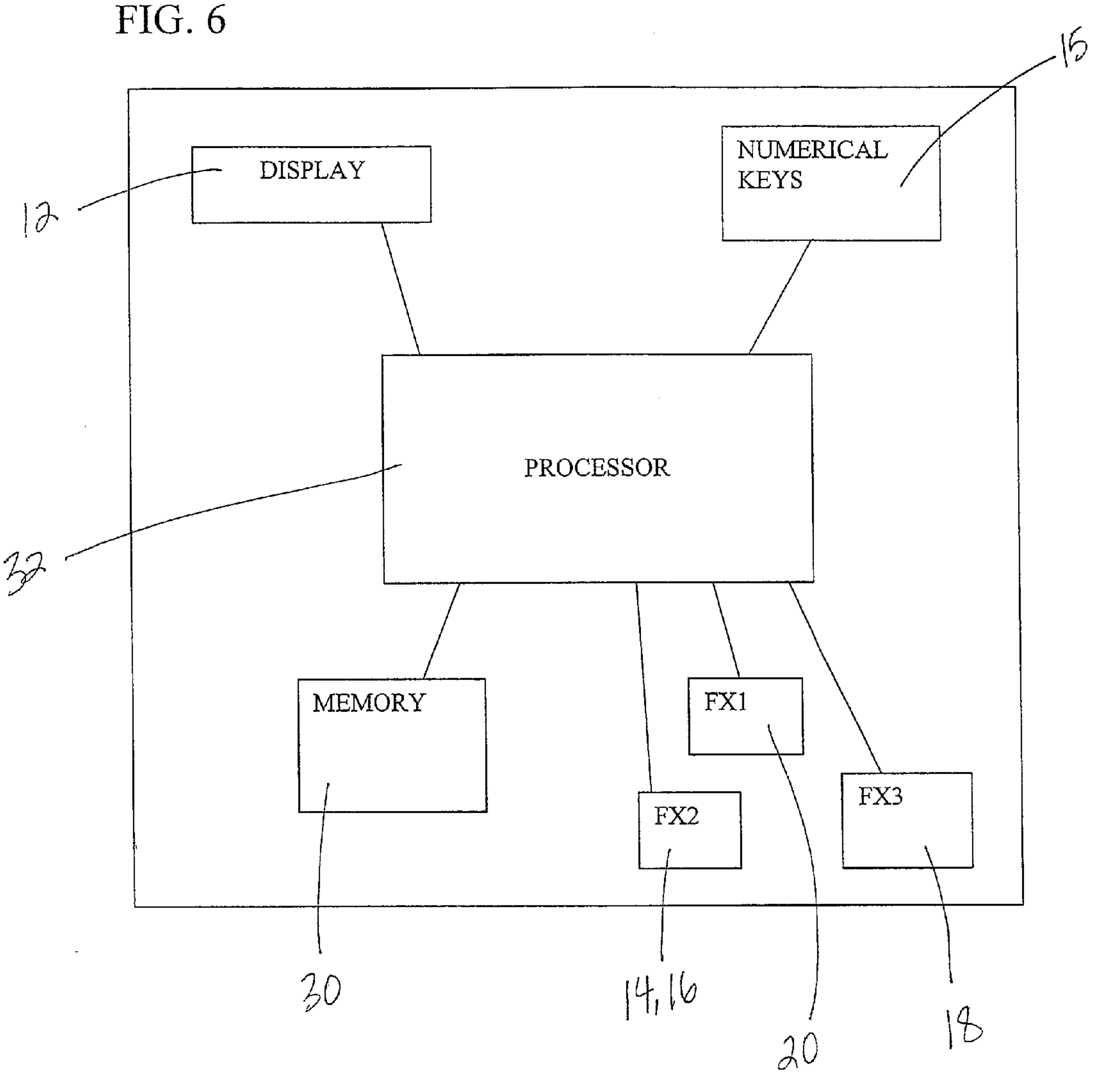
FIG. 6 shows a block diagram of the tip meter.

FIG. 6 provides a block diagram of the tip meter 10. Generally, a processor 32 is coupled to a display screen 12, and buttons that perform functions, such as the FUNCTION button 20, numeric keys 15, and the up 14 and down 16 buttons for raising and lowering the tip percentage. Additional functional keys can include the service light 18. The processor 32 is any processor, including a processor that is capable of performing mathematical computations. In one embodiment, additional functionality is provided to the processor 32 via a memory component 30 that is coupled to the processor 32.

Example Of Use

Figure 4:
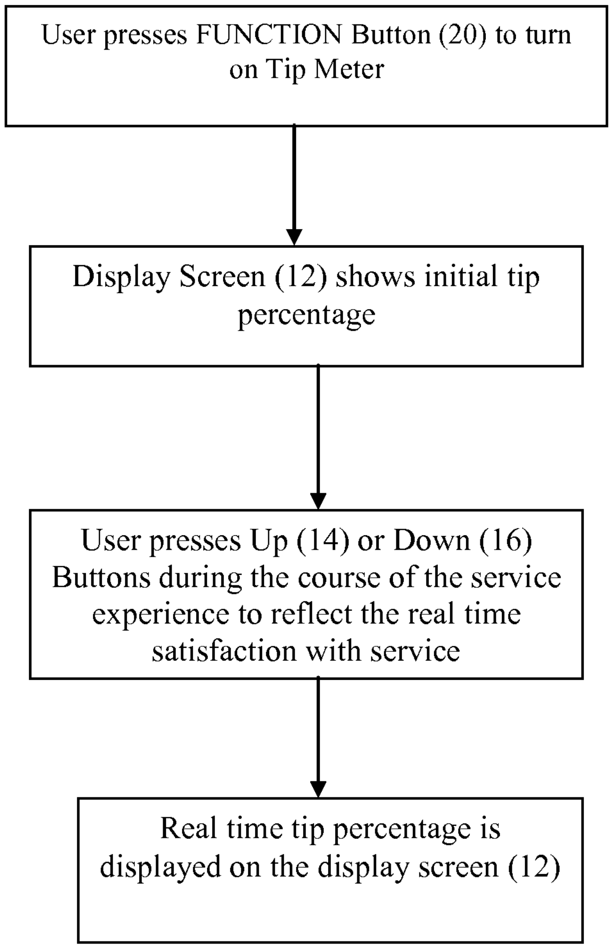
FIG. 4 shows a flow chart of the method of use of the tip meter to convey real time satisfaction to a server.
Figure 5:
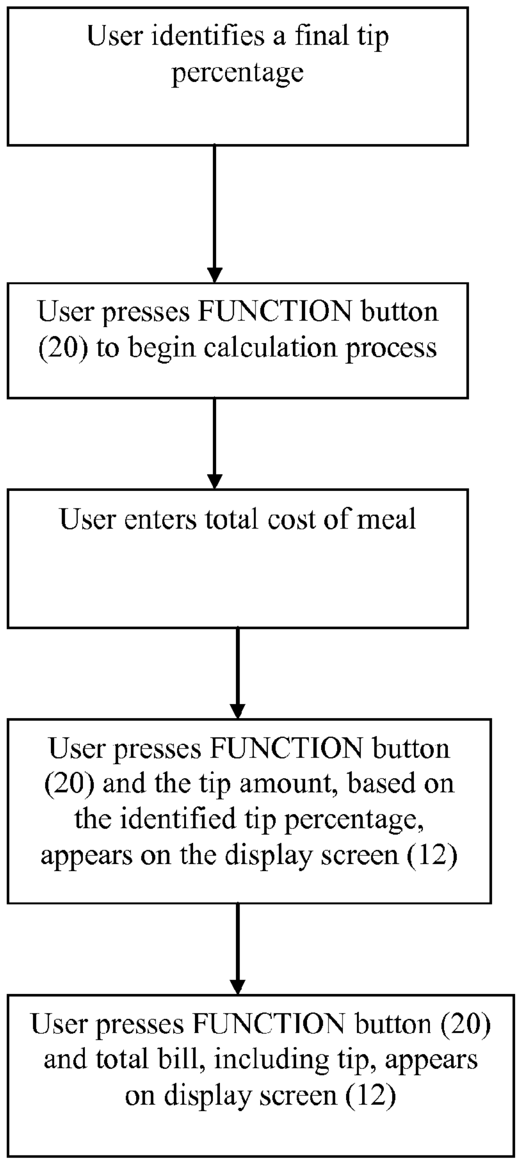
FIG. 5 shows a flow chart of the method of use of the tip meter to calculate a total bill using a final tip percentage identified by the user.

In this example, as shown generally in FIGS. 4-5, the tip meter is used in a restaurant during the course of a meal with service provided by a waiter. After being seated, the customer presses the FUNCTION button 20 to turn on the tip meter 10. The display screen 12 shows 15% (considered standard tip percentage). Throughout the course of the meal, the customer uses the up- and down-buttons 14, 16 to change the percentage displayed in the display window 12 depending on the customer's satisfaction with the service. As a result of the change in tip percentage shown in the display window 12, the service staff can try to change the service with the goal of increasing the tip paid at the end of the meal. If, for example, the tip percentage is changed to 10%, the service staff can alter the level of service in the hope of improving the customer's experience and consequently be paid a higher tip at the end of the meal.

Illustrated in FIG. 5, when the customer has adjusted the tip percentage to the desired level, the FUNCTION button 20 is pressed to begin the tip calculation process. The customer enters in the total cost of the meal and again presses the FUNCTION button 20. The tip meter will display the calculated tip. The customer presses the FUNCTION button 20 once again to display the total bill, including the tip. To turn off the tip meter, the FUNCTION button 20 is pushed again.

Figure 2:
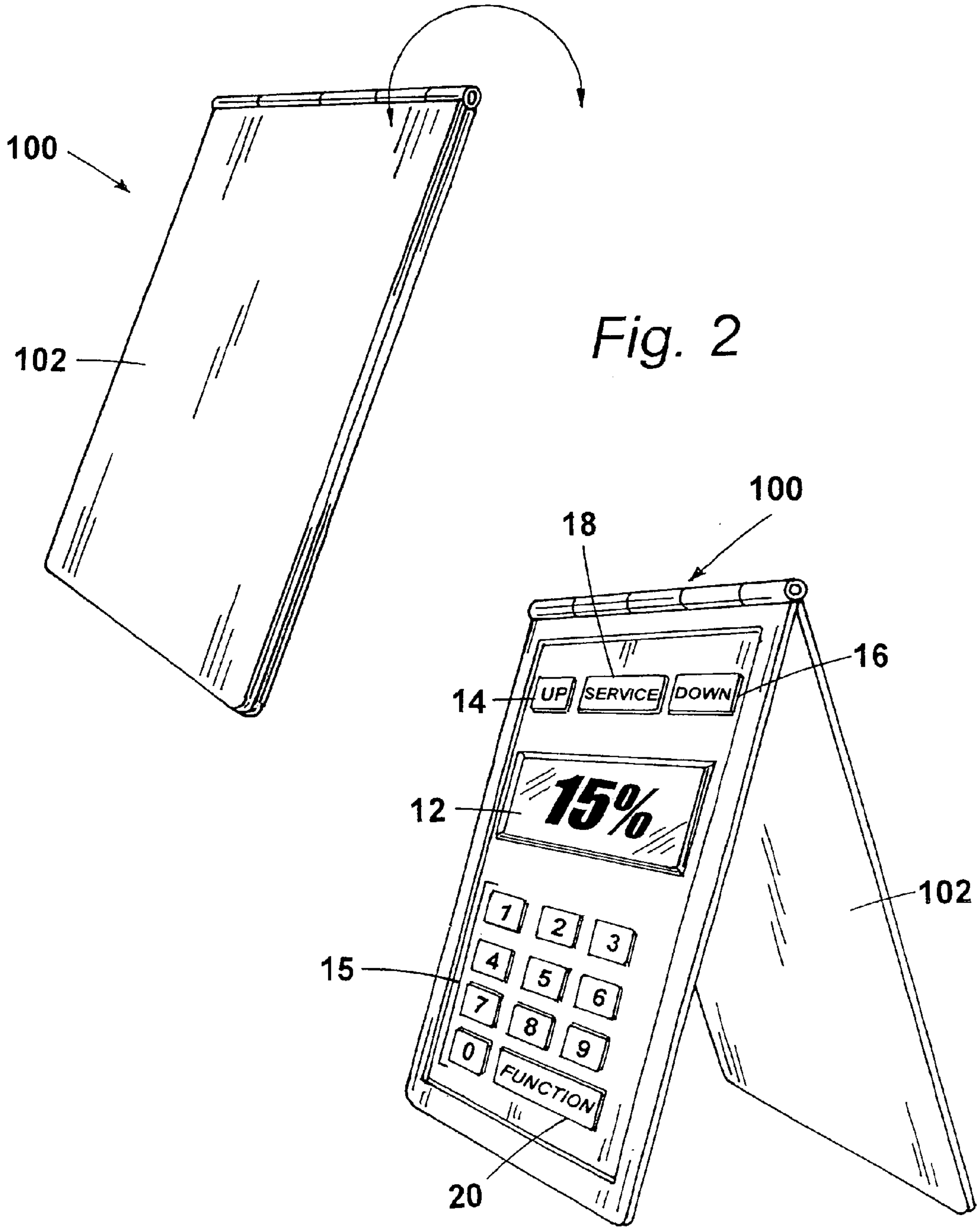
FIG. 2 shows a portable embodiment of the tip meter of the present invention.

In one embodiment, shown in FIG. 2, the invention is a personal tip meter 100. In this embodiment, the meter 100 is small enough to be carried on a person. For example, the personal meter 100 is approximately the size of a checkbook. The meter 100 is carried by the customer, and used whenever the customer is in a service situation where a tip is typically paid. In this embodiment the meter 100 can include a cover 102. When the meter 100 is used the cover 102 is flipped over and acts as a stand to hold the meter 100 upright, such that the service staff and the customer can see the display window 12.

Figure 3:
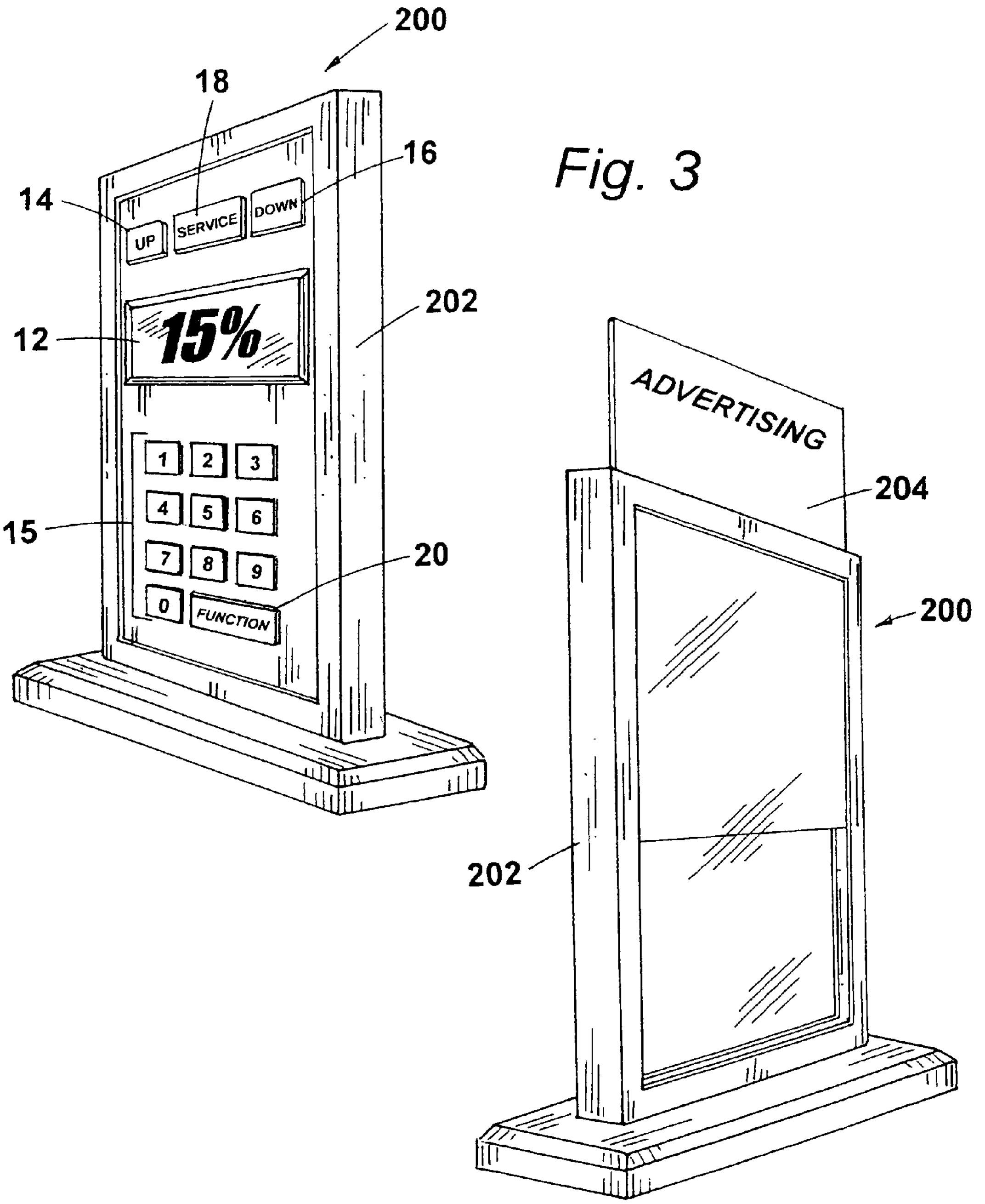
FIG. 3 shows a fixed embodiment of the tip meter of the present invention.

As shown in FIG. 3, another embodiment is the commercial tip meter 200. The restaurant or other service facility provides the tip meter 200. In this embodiment the meter 200 is housed in a frame 202 to hold the tip meter 200 upright. The back side 204 of this embodiment can be used for advertisements and for displaying instructions for the tip meter 200.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention. For example, the tip meter 10 is contemplated for use in any environment where tips are typically given, including restaurants, salons, bars, etc. The tip meter 10 can be a calculator-type device with raised buttons, or the tip meter 10 can be a flat screen, flat button device. Further, the tip meter 10 can include the capability of splitting the bill among individuals or groups of individuals by calculating the final bill, including the set tip level for individuals or smaller groups within a larger group.

The invention claimed is:

1. A method of use of a tip meter for reflecting customer service satisfaction comprising the steps of:

a) providing a tip meter comprising:

i) a housing;

ii) a single display screen on the housing sized to be viewed by a passing service provider;

iii) a plurality of buttons on the housing, wherein the buttons further comprise at least one function button and at least one button to raise and lower a tip percentage; and iv) a means for performing functions coupled to the display screen and the plurality of buttons;

b) displaying the tip meter so as to allow the service provider visual access to the tip amount throughout the term of service, wherein a tip percentage is shown on the display at all times during the term of service; and c) updating the amount of the tip during the term of service to reflect customer satisfaction.

2. The method of claim 1, wherein the plurality of buttons further comprises a grouping of buttons designating whole numbers 0 through 9.

3. The method of claim 2, further comprising the step of inputting a bill using the designated number buttons.

4. The method of claim 3, further comprising the step of calculating a tip based on an identified tip percentage.

5. The method of claim 4, further comprising the step of calculating a total bill, including a tip percentage.

6. The method of claim 1 wherein the tip meter has a service light.

7. The method of claim 1 wherein the tip meter is displayed substantially upright.

8. The method of claim 1, wherein the tip meter is propped upright on a table.

9. The method of claim 1, wherein the tip amount shown on the display screen is reduced during the term of service in response to customer dissatisfaction.

10. The method of claim 1, wherein the tip amount shown on the display screen is increased during the term of service in response to customer satisfaction.

11. The method of claim 1, further comprising the step of turning the tip meter on at the beginning of the term of service.

12. The method of claim 11, wherein an initial tip percentage is displayed on the display screen when the tip meter is turned on.

13. The method of claim 12, further comprising the step of decreasing the initial tip percentage in response to customer satisfaction, wherein the decreased tip percentage is displayed on the display screen.

14. The method of claim 13, further comprising the step of increasing the initial tip percentage in response to customer satisfaction, wherein the increased tip percentage is displayed on the display screen.

15. The method of claim 1, wherein the tip percentage on the display screen is viewed by a service provider.

16. The method of claim 1, wherein the term of service begins at around the time customers are seated and ends at around the time the final bill is paid.

17. A method of use of a tip meter for reflecting customer service satisfaction comprising the steps of:

a) providing a tip meter comprising:

i) a housing;

ii) a display screen on the housing sized to be viewed by a passing service provider;

iii) a plurality of buttons on the housing, wherein the buttons further comprise at least one function button and at least one button to raise and lower a tip percentage, wherein operation of the function button performs at least the functions of turning the tip meter on, turning the tip meter off, calculating the tip from a final bill and an identified tip percentage, and calculating a total bill; and iv) a means for performing functions coupled to the display screen and the plurality of buttons;

b) displaying the tip meter so as to allow the service provider visual access to the tip amount throughout the term of service, wherein a tip percentage is shown on the display at all times during the term of service; and c) updating the amount of the tip during the term of service to reflect customer satisfaction.

* * * * *